Aug. 1, 1950 H. L. WURGAFT 2,517,520
CITRUS FRUIT REAMING MECHANISM

Filed Feb. 25, 1946 3 Sheets-Sheet 1

Inventor
HARRY L. WURGAFT
By Hazard and Miller
Attorneys

Aug. 1, 1950  H. L. WURGAFT  2,517,520
CITRUS FRUIT REAMING MECHANISM
Filed Feb. 25, 1946  3 Sheets-Sheet 2

Inventor
HARRY L. WURGAFT
By Hazard Miller
Attorneys

Aug. 1, 1950 H. L. WURGAFT 2,517,520
CITRUS FRUIT REAMING MECHANISM
Filed Feb. 25, 1946 3 Sheets-Sheet 3
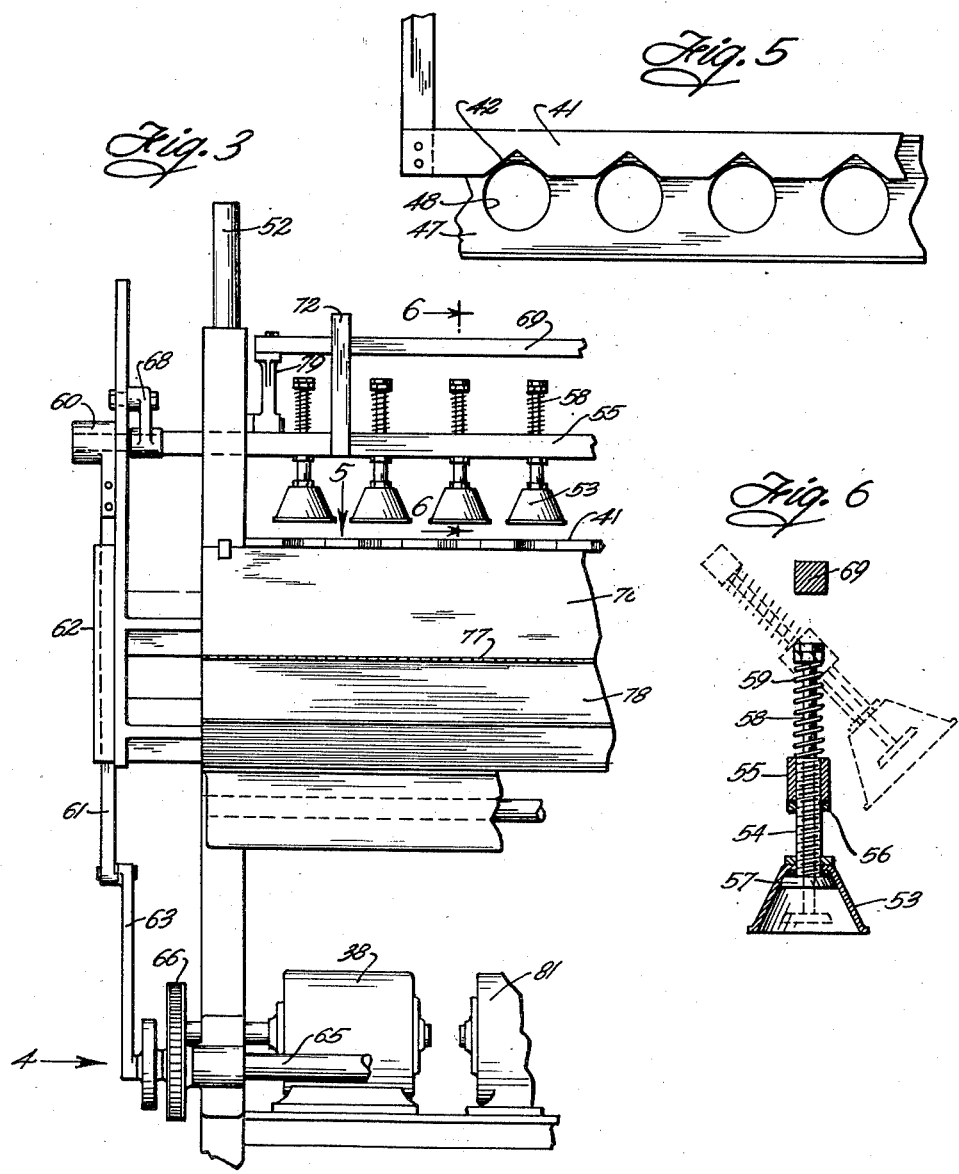
Inventor
HARRY L. WURGAFT
By Hazard and Miller
Attorneys Patented Aug. 1, 1950

2,517,520

UNITED STATES PATENT OFFICE 2,517,520

CITRUS FRUIT REAMING MECHANISM

Harry L. Wurgaft, Fullerton, Calif., assignor to Fred S. Markham and Maziebelle G. Markham Application February 25, 1946, Serial No. 649,961

4 Claims. (Cl. 146—3)

This invention relates to improvements in citrus juice extractors, and may be regarded as an improvement over the construction disclosed in my pending application Serial No. 544,343, filed July 11, 1944.

In the above-mentioned application there is disclosed a citrus juice extractor wherein citrus fruits are carried by a conveyor against a knife so as to be split thereby into two halves that fall apart onto carriers of the conveyor and are deposited cut-face down on a support or shelf. The halves of the fruit are then pushed from the shelf onto an apertured plate that is descendible over reamers. Means is provided for forcing cups down onto the fruit halves to push them together with the apertured plate into engagement with the reamers after which the plate is allowed to lift the fruit halves and the cups are caused to release them and the reamed peels are then pushed off of the plate onto a conveyor.

An object of the present invention is to provide an improved citrus juice extractor employing some of the principles of the construction disclosed in the above-mentioned application and wherein the cups are provided with ejectors for ejecting the reamed peels from the cups after the reaming operation has been completed.

More specifically, an object of the invention is to provide a citrus juice extractor wherein the halves of the fruit are positioned cut-face down over a descendible support and plate and are engageable by inverted cups which force the fruit halves and the plate downwardly so that the fruit halves may be reamed, and to provide means for lifting and tilting the cups after the halves have been reamed and ejecting the peels from the cups while the cups are in tilted positions.

Another object of the invention is to provide a citrus juice extractor wherein the cutting means which divide the whole fruit into halves consists of two knives consecutively arranged, one of which presents a cutting edge facing toward the conveyor and having only a slight inclination with respect thereto so as to only partially sever the fruit and the second knife has a more abrupt inclination to the carrier and serves to complete the severance of the fruit into halves.

Another object of the invention is to provide a citrus juice extractor consisting of a bank of severing knives, reamers, and mechanisms for applying the halves to the reamers and expelling the reamed peels with chutes leading to the knives for the citrus fruit and to provide means for simultaneously adjusting all chutes of the bank to enable the handling of citrus fruit of various sizes.

More specifically, an object of the invention is to provide an adjusting means for the chutes which will enable the centers of the chutes to remain in alignment or in the same plane with the severing knives regardless of the adjustments of the chutes to accommodate different sizes of fruits.

With the foregoing and other objects in view, which will be made manifest in the following detailed description and specifically pointed out in the appended claims, reference is had to the accompanying drawings for an illustrative embodiment of the invention, wherein:

Fig. 3 is a partial view in front elevation of the citrus juice extractor and may be regarded as taken in the direction of the arrow 3 upon Fig. 2;

Fig. 4 is a partial view in side elevation of a detail of construction and may be regarded as taken in the direction of the arrow 4 of Fig. 3;

Fig. 5 is a partial view in plan of the apertured plate and centering bar and may be regarded as taken in the direction of the arrow 5 upon Fig. 3;

Fig. 6 is a sectional view taken substantially upon the line 6—6 upon Fig. 3;

Figure 1:
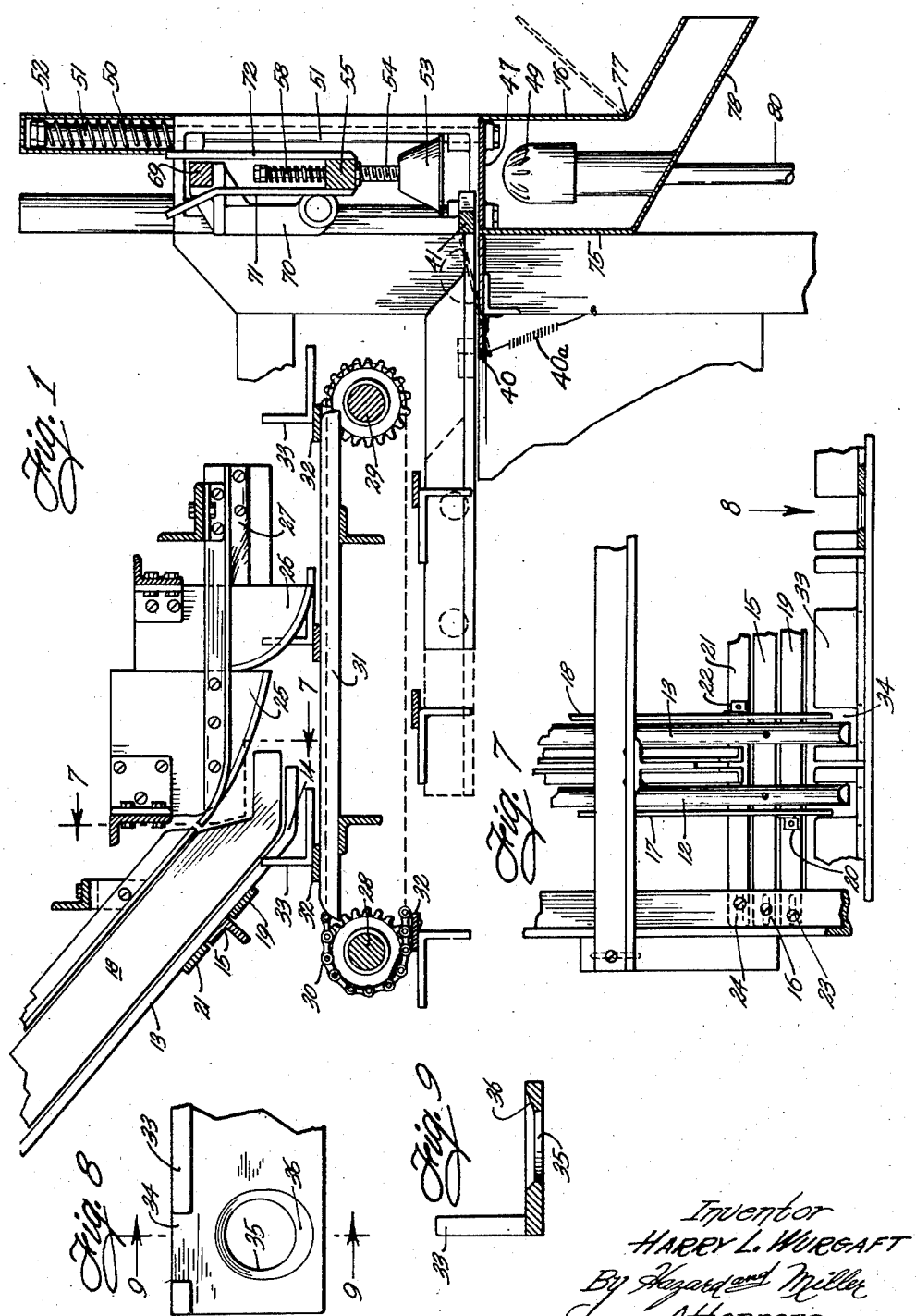
Figure 1 is a partial longitudinal section through a portion of the citrus juice extractor embodying the present invention.

Fig. 7 is a partial view of that portion of that construction illustrated on the line 7—7 upon Fig. 1, in the direction indicated, Fig. 8 is a partial view in plan of a portion of one of the carriers and may be regarded as taken in the direction of the arrow 8 upon Fig. 7; and Fig. 9 is a vertical section taken substantially upon the line 9—9 upon Fig. 8.

Referring to the accompanying drawings wherein similar reference characters designate similar parts throughout, the oranges or other citrus fruit may be assumed to have been graded as to size, such as by a grader 10 and deposited on an endless conveyor 11 which feeds the oranges to the upper ends of the inclined chutes. Each of these chutes is provided by spaced inclined rails 12 and 13 preferably in the form of half-round metal bars that are inclined throughout a major portion of their lengths and have their lower ends bent horizontally as indicated at 14 on Fig. 1. The rails of each chute are in turn mounted on transversely extending bars 15 extending the complete width of the machine and have slotted ends at 16 through which bolts or other fasteners extend to mount the bars on the frame of the machine. The slotted connection at 16 between the bars 15 and the frame enables the adjustment of all rails laterally with respect to the machine so that the space therebetween may be centered with respect to the severing knives. Outwardly of the rails 12 and 13 the chutes have sides formed by sheet metal sections 17 and 18. The sides 17 of the various chutes are secured to transversely extending bars 19 as by brackets 20 and the sides 18 of the various chutes are secured to bars 21 as by brackets 22. The bars 19 and 21 have bolt and slot connections with the frame of the machine as indicated at 23 and 24, respectively, so that on adjustment of the bar 21 in a transverse direction with relation to the frame all of the sides 18 will be simultaneously adjusted to the same extent. In a similar manner on adjustment of the bar 19 all sides 17 of the various chutes will be simultaneously adjusted and to the same extent. In this manner, the rails 12 and 13 remain the same distance apart under all conditions and will support all sizes of fruit as they descend through the chutes. If a larger size of fruit is to be run through the machine adjustments of the bars 19 and 21 will simultaneously widen the space between the rails 17 and 18 of all chutes the required distance to accommodate a larger size of fruit and conversely if a smaller size of fruit is to be used the chutes may have their sides 17 and 18 brought closer together to more nearly fit around the smaller fruit. The adjustment of all chutes is accomplished by merely adjusting the bars 19 and 21 with relation to the frame.

Figure 2:
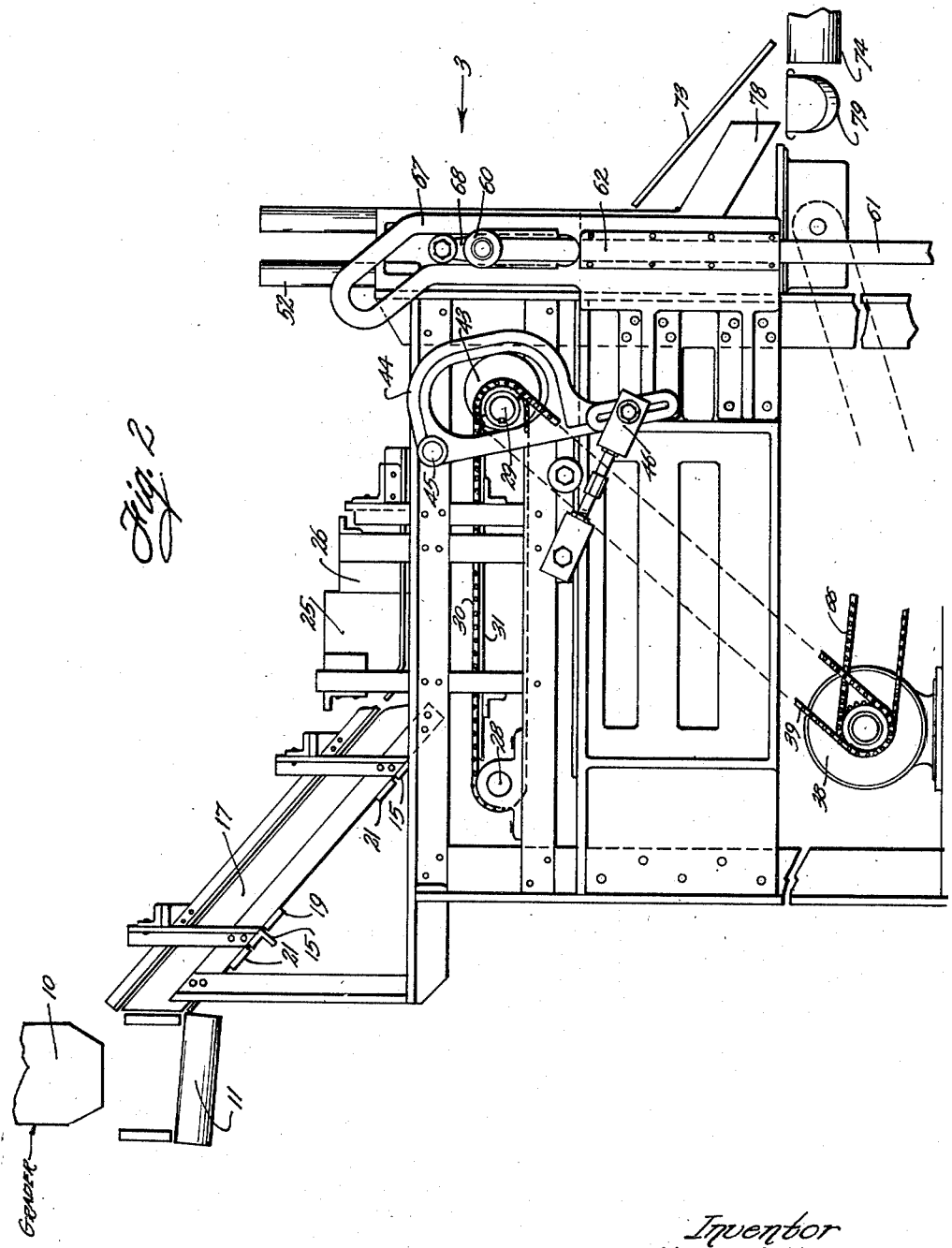
Fig. 2 is a view in side elevation of the same.

At the bottom of each chute there is a kniffe 25 the plane of which is disposed centrally between the rails 12 and 13. This knife presents a downwardly curved cutting edge that is slightly inclined to the horizontal and behind this knife there is a second knife 26 in the same plane and presenting a cutting edge that is more abrupt to the horizontal. Behind the second knife there is a spreader or divider 27 presenting tapered sides that serve to split or spread the halves of the cut fruit after severance by the knives 25 and 26. Rotary shafts 28 and 29 extend transversely of the machine and have sprockets thereon over which endless chains 30 are trained. The upper runs or reaches of these endless chains are preferably supported on guides 31 to prevent their sagging. These endless chains have secured thereto transversely extending bars 32 on which are mounted carriers. The carriers are angular in cross-section having upstanding portions 33 that are slotted as at 34 to permit them to pass the lower ends of the rails 12 and 13 and the sides 17 and 18. The horizontal portions of the carriers have apertures 35 therein, the forward edges of which are beveled as at 36. The horizontal portions of the carriers at their adjoining ends are adapted to receive the fruit from the lower ends 14 of the rails 12 and 13. The upright portions serve to carry the fruit against the knife 25 which by reason of the inclination of its cutting edge tends to press the fruit down on the horizontal portions while effecting a cut through the upper portion of the fruit. Thereafter, the fruit is carried against the second knife 26 which severs the remainder of the fruit, thus dividing it into two halves which are spread and allowed to fall outwardly by the spreader 27 nesting themselves in the apertures 35 cut-face uppermost. The conveyor formed by the chains 30 and the carriers thereon is adapted to be driven from any suitable source of power such as a motor 38 through a chain 39 which is trained over a sprocket on one of the shafts. At the forward end of the conveyor there is a hinged platform or plate 40 that is urged from the horizontal position shown in Fig. 1 into the dotted line inclined position by a spring 40a. As the carriers pass around the shaft 29 they spill the cut halves of the fruit from the conveyor onto this plate or platform 40 so that they occupy cut face down positions thereon. The manner in which the halves are dropped onto the plate 40 is to some extent governed by the bevel at 36 of the forward sides of the apertures 35 for as the carriers begin to tilt about the shaft 29 the halves of the fruit resting in the apertures tend to roll on this bevelled surface. The degree of bevel governs the extent of rolling and causes the halves to be properly positioned on the plate 40. A pusher bar 41 having notches 42, see Fig. 5, is horizontally reciprocable over the plate or platform and when in retracted position permits the plate to swing upwardly into the dotted line position to receive the cut halves of the fruit. As the pusher bar moves forwardly it swings the plate or platform down into a horizontal position against the action of the tension spring 40a. The pusher bar is operable by a cam or eccentric 43 that is mounted on the shaft 29. This cam or eccentric actuates a cam follower 44 pivoted at 45 and connected by means of a pitman 46 to the frame of the pusher bar. Preferably these parts are positioned at each end of the machine and operate in unison to reciprocate the pusher bar which pushes the inverted halves of the fruit on the platform 40 forwardly onto a descendible plate 47 that normally occupies a position flush with the plate 40 when the plate 40 is in horizontal position. This plate 47 has apertures therein indicated at 48 arranged in vertical alignment with rotary reamers 49. The notches 42 are so positioned as to tend to center the fruit halves with respect to these apertures and the length of forward strokes is governed by the adjustment of the pitman 46 both as to length and with relation to the connection between the pitman and the cam follower. Thus, the pusher bar has its notches arranged to center the fruit halves laterally with respect to the apertures and the adjustments governing the stroke of the pusher bar center the halves longitudinally of the machine to properly position them over the apertures 48. The apertures 48 are of a size slightly smaller than the size of the fruit used so that the halves will rest on the edges of their peels around the edges of the apertures 48 and have the pulp of the fruit exposed through the apertures. The descendible plate 47 is normally urged upwardly by compression springs 50 disposed about rods 51 secured to the descendible plate with the springs supported at their lower ends on portions of the machine. These springs and rods are preferably housed within housings 52. Above the plate there are cups 53 equipped with tubular threaded shanks 54 that are screwed into a bar or crosshead 55. The positions of these cups with relation to the crosshead are maintained by means of jamb nuts 56. Ejectors have heads 57 disposed in the tops of the cups and stems 58 extending upwardly through the shanks 54. These ejectors are urged into their uppermost positions within the cups by compression springs 59. The ends of the crosshead 55 are pivotally mounted in bearings 60 which are vertically reciprocable by vertical arms 61 slidable in guides 62. The arms are actuated by connecting rods 63 that connect the lower ends of the arms with crank pins 64 on the ends of a shaft 65 which is driven from the motor such as by a chain 66. Adjacent the guides 62 there are slotted cams 67 and the crosshead carries at each end thereof an arm or crank 68 which extends into the slot of the cam a short distance above the crosshead. The slot in the cam as clearly shown in Fig. 2, is angular in form and as the crosshead is vertically raised and lowered by the arms 61 in the vertical portion of the slot the arms or cranks 68 traverse the angular portion of the slot. The arrangement is such that the crosshead 55 during its reciprocation moves upwardly and downwardly vertically over the apertures 48 and the reamers 49 but near the top of its stroke the arms or cranks 68 enter the angular portions of the slot and turn or tilt the crosshead into a tilted position as shown in dotted lines on Fig. 6. Above the crosshead 55 there is an ejector actuating bar 69 which is pivotally supported on the frame by means of arms 70. The crosshead adjacent each end carries a pair of opposed guides 71 and 72 between which the bar 69 is reciprocable when the crosshead approaches its uppermost position. These guides embrace and maintain the bar 69 in alignment with the stems 58 of the ejectors during the tilting of the crosshead so that when the crosshead is tilted in its uppermost position as illustrated in dotted lines upon Fig. 6, the upper ends of the stems 58 may engage the bar 69 to force the ejector downwardly within the cups against the actions of the compression springs 59. In this position the peels that are retained in the cups after the fruit has been reamed may be expelled therefrom and fall onto an inclined shelf 73 which deposits the peels on a conveyor 74. The reamers 49 are located in a trough 75 one side of which indicated at 76 is removable by swinging outwardly about a hinge 77 to facilitate cleaning the reamers and the interior of the trough. The trough has a downwardly inclined spout 78 which discharges the juice into a conduit 79.

The operation of the above-described construction is substantially as follows: When the fruit halves are deposited on the platform 40 they are moved forwardly and centered with respect to the apertures 48 by the pusher bar 41. The arms 61 are then brought downwardly to cause the crosshead 55 to force the cups 53 into engagement with the tops of the fruit halves. Continued downward movement causes the cups to press the fruit halves and also the descendible plate 47 downwardly. The fruit halves are thus carried into engagement with the tops of the reamers and are reamed thereby. The reamers are preferably of the rotary type having shafts 80 driven by a motor such as that indicated at 81. When the halves have been reamed the arms 61 are forced upwardly causing the crosshead to lift the cups. This allows the descendible plate 47 to return to its normal position flush with the platform 40. During the continued upward movement of the crosshead the guides 71 and 72 receive the bar 69 therebetween and near the top of the upward stroke the arms or cranks 68 enter the inclined portions of the slots in the cams 67 and tilt the crosshead. As the guides 71 and 72 are rigid with the crosshead and have the bar 69 confined therebetween this bar is swung in unison with the crosshead and maintained in alignment with the ends of the stems 58. Adjacent the upper end of the stroke of the crosshead these stems engage the bar 69 to depress the ejectors and expel the peels from the cups. The juice that is reamed is collected in the trough 75 and discharged into the conduit 79. During a succeeding downward stroke of the crosshead the cups return to their normal vertical position in alignment with the reamers to receive succeeding fruit halves that are pushed forwardly onto the descendible plate 47 by the pusher bar 41.

In handling fruit of different sizes it will be appreciated that it is merely necessary to adjust bars 19 and 21 to simultaneously adjust all chutes and to keep the center lines of the adjusted chutes in alignment with the knives. If the sizes vary materially a substitution of descendible plates 47 and reamers 49 may be required.

Various changes may be made in the details of construction without departing from the spirit and scope of the invention as defined by the appended claims.

I claim:

1. A citrus fruit reaming mechanism comprising a plurality of rotary reamers, an apertured plate thereover having apertures in registration with the reamers, means supporting the plate for descent toward the reamers but urging the plate into a normal position thereabove, means for positioning fruit halves on the plate in cut-face-down position over the apertures therein, inverted cups over the reamers, means for forcing the cups downwardly into engagement with the fruit halves on the plate to move the fruit halves and plate downwardly so that the fruit halves may be reamed by the reamers through the apertures in the plate and thereafter elevating the cups allowing the plate to return to its normal position and lifting the cups above the plate in a direction substantially normal thereto, means for turning the cups from a position in alignment with the reamers while said cups are above said plate, and means for ejecting the skins from the cups while the cups are in their disaligned positions.

2. A citrus fruit reaming mechanism comprising a plurality of reamers, an apertured plate disposed thereover, means mounting the plate for descension over the reamers but urging the plate into a normal position thereabove, means for feeding fruit halves over the plate and centering said fruit halves over the apertures in the plate so as to be aligned with the reamers, inverted cups over the apertures in the plate, means for forcing the cups downwardly to carry the fruit halves and plate toward the reamers, means for elevating the cups above the plate, means for then turning the cups out of alignment with the reamers while elevated, and means for ejecting the skins from the cups while the cups are in their turned positions.

3. A citrus fruit reaming mechanism comprising a plurality of reamers, an apertured plate mounted for descension thereover but normally urged into a position thereabove, means for centering fruit halves over the apertures in the plate, a transverse bar over the plate, means for moving the bar up and down over the plate, a plurality of inverted cups on the bar arranged over the apertures in the plate whereby when the bar is moved downwardly the cups may engage the fruit halves and carry the fruit halves and plate toward the reamers to ream the fruit, means for tilting the bar and the cups carried thereby when the bar is in its uppermost position, and means for ejecting the skins from the cups when in tilted position.

4. A citrus fruit reaming mechanism comprising a plurality of reamers, an apertured plate mounted for descension thereover but normally urged into a position thereabove, means for centering fruit halves over the apertures in the plate, a transverse bar over the plate, means for moving the bar up and down over the plate, a plurality of inverted cups on the bar arranged over the apertures in the plate whereby when the bar is moved downwardly the cups may engage the fruit halves and carry the fruit halves and plate toward the reamers to ream the fruit, means for tilting the bar and the cups carried thereby when the bar is in its uppermost position, ejectors within the cups having stems extending upwardly therethrough, and a bar engageable by the stems when the cups are tilted to actuate the ejectors and expel the skins from the cups while the cups are in their tilted positions.

HARRY L. WURGAFT.

REFERENCES CITED

The following references are of record in the file of this patent:

UNITED STATES PATENTS

| Number | Name | Date |
|---|---|---|
| 1,130,819 | Hill | Mar. 9, 1915 |
| 1,888,529 | Faulds | Nov. 22, 1932 |
| 2,017,960 | Faulds | Oct. 22, 1935 |
| 2,163,791 | Lang | June 27, 1939 |
| 2,311,565 | Nelson | Feb. 16, 1943 |
| 2,313,318 | Brown et al. | Mar. 9, 1943 |